Feb. 15, 1949.  J. M. LANG  2,461,745
HINGE STRUCTURE FOR AIRCRAFT SURFACES
Filed Dec. 28, 1944  2 Sheets-Sheet 2
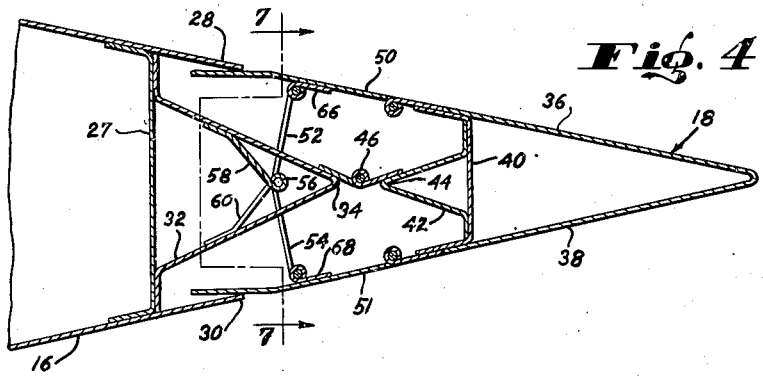
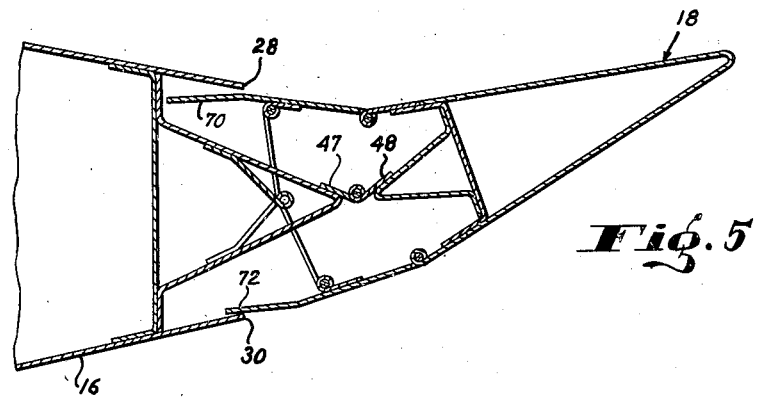
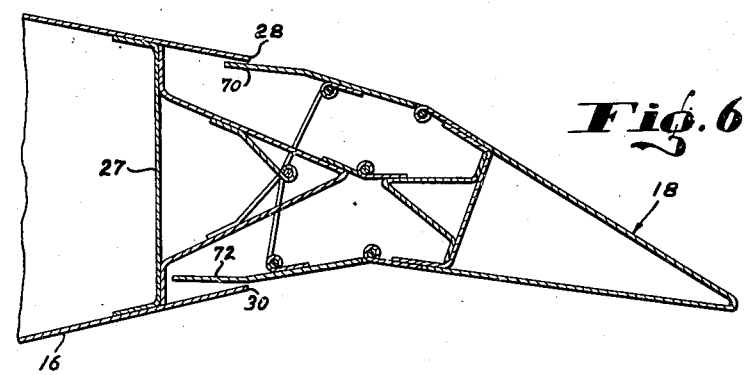
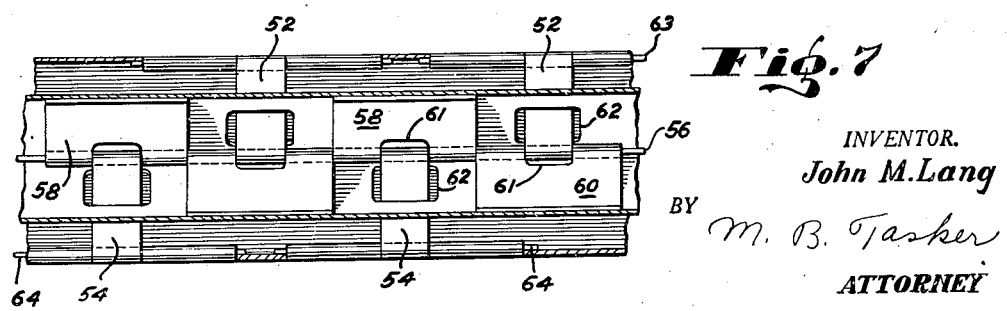
INVENTOR.
John M. Lang
BY M. B. Tasker
ATTORNEY Patented Feb. 15, 1949

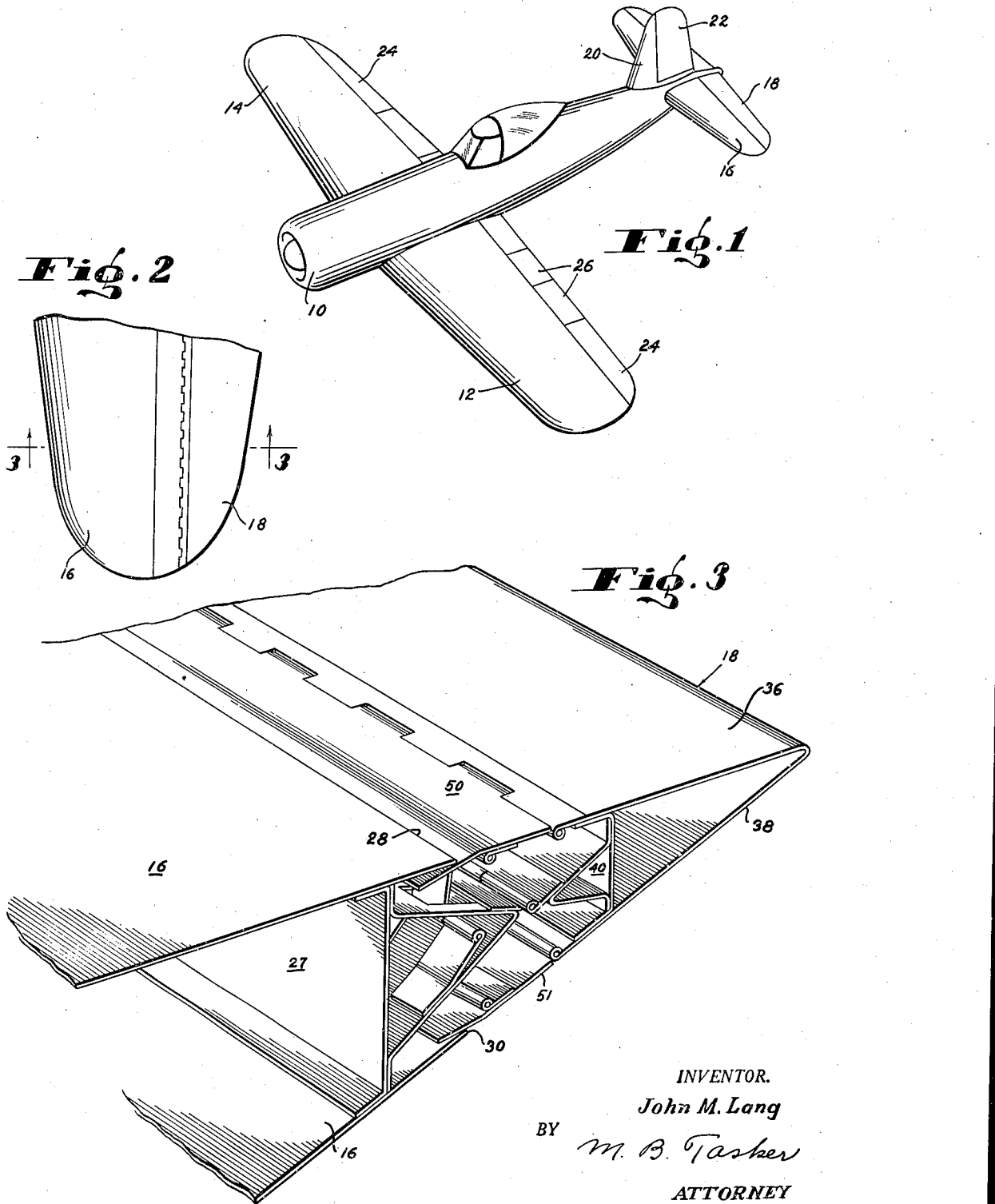

2,461,745

UNITED STATES PATENT OFFICE 2,461,745

HINGE STRUCTURE FOR AIRCRAFT SURFACES

John M. Lang, Bridgeport, Conn., assignor to United Aircraft Corporation, East Hartford, Conn., a corporation of Delaware Application December 28, 1944, Serial No. 570,139

8 Claims. (Cl. 244—130)

1

This invention relates to aircraft of the type in which a main airfoil surface has auxiliary control surfaces pivotally mounted thereon, usually at the trailing edge of the main surface.

An object of the invention is to provide means for closing the hinge gap between a main airfoil surface and a relatively movable surface mounted thereon.

A further object of the invention is to provide closure means of this type which results in continuous smooth top and bottom surfaces between the main and auxiliary portions of such an airfoil throughout the range of angular adjustment of the auxiliary control surface.

A still further object of the invention is to reduce the drag on the wing surfaces of an airplane due to air leakage at the line of pivotal attachment of the auxiliary control surfaces and due to undesired changes in form of the wing surfaces resulting from deflections of the auxiliary surfaces.

Other objects and advantages of the invention will be apparent from the following description of the accompanying drawings in which one embodiment of the invention has been shown for purposes of illustration.

In these drawings,

Fig. 1 is an isometric view of an airplane having trailing edge control surfaces embodying the invention;

Fig. 2 is an enlarged detail of a tail surface of Fig. 1;

Fig. 3 is a perspective view of a portion of the tail of Fig. 2 taken on line 3—3 of Fig. 2 on a much enlarged scale;

Figs. 4, 5 and 6 are chordwise sectional views taken on line 3—3 of Fig. 2 and showing the auxiliary control surface in three different positions of angular adjustment relative to the main surface; and Fig. 7 is a sectional view on line 7—7 of Fig. 4.

Referring to Fig. 1, the invention is illustrated in connection with an airplane having fuselage 10, wings 12 and 14 and the usual empennage including horizontal stabilizing surfaces 16, elevators 18, vertical fin 20, and rudder 22. The wings are further provided with trailing edge ailerons 24 and flaps 26. While the invention is applicable to any of the moveable auxiliary surfaces of the airplane, for purposes of detailed description, the invention has been illustrated in Figs. 2 to 7 as applied to an elevator 18.

As shown herein, the main stabilizer 16 is provided with a trailing edge recess formed by a spanwise partition 27 located slightly forward of

2 the top and bottom trailing edges 28 and 30. A rearwardly projecting A-shaped bracket 32 is secured to partition 27 having its apex 34 terminating midway between the trailing edges 28 and 30 and somewhat aft thereof. The elevator 18 comprising the usual upper and lower surfaces 36 and 38 has a vertical partition 40 similar to partition 27 which carries an A-shaped bracket 42 the apex 44 of which terminates adjacent the apex 34 of stabilizer bracket 32 on which the elevator is supported by a strip, or piano hinge 46, this hinge having its complemental hinge parts 47 and 48 suitably secured to brackets 32 and 42.

In accordance with the present invention the lateral spaces, or gaps between the forward extremities of elevator surfaces 36 and 38 and the trailing edges 28 and 30 of the stabilizer are provided with closure means presenting continuous smooth surfaces between the main wing portion and the elevator throughout the range of angular adjustment of the latter, while also providing an effective airseal between the top and bottom surfaces of the stabilizer and the elevator.

To this end, the elevator surfaces 36 and 38 are provided with rigid plate-like extensions 50 and 51 which are pivotally connected at their rear edges to the forward edges of surfaces 36 and 38 respectively. This pivotal connection is effected by rolling the forward edge portions of surfaces 36 and 38 inwardly to form part of a piano hinge, the mating part of which is formed on the rear edges of extensions 50 and 51. These hinge connections are clearly shown in Fig. 3 from which it will be apparent that all projecting portions of the hinge are disposed within the airfoil surfaces so that the pivoted junction between members 50 and 51 and the elevator present continuous smooth outer surfaces which remain substantially airtight throughout the range of angular movement of the elevator 18 as indicated in Figs. 5 and 6.

Means are provided to guide the free ends of plate-like members 50 and 51 during angular movements of the elevator so as to maintain them in constantly close proximity to edges 28 and 30 respectively. This means includes a plurality of narrow links 52 and 54 which are connected at their inner ends to a common pivot pin 56 of a piano hinge comprising cooperating hinge parts 58 and 60 secured to bracket 32, the hinge parts 58 and 60 having portions thereof cut away at 61 to accommodate the links 52 and 54. The links 52 and 54 pass through suitable openings 62 in bracket 32 and are connected at their extended end to pins 63 and 64 which comprise the hinge pins for hinge parts 66 and 68 secured to the inner surfaces of plates 50 and 51.

The free end portions 70 and 72 of plates 50 and 51 are mutually inwardly deflected and extend a substantial distance into the recess formed in the trailing edge of the stabilizer. The relation of these deflected end portions and the length of links 52 and 54 is such that during movement of elevator 18 on either side of its mid position shown in Fig. 4 the deflected end portions of plates 50 and 51 are maintained in close overlapping relation with the edges 28 and 30. Thus when the elevator 18 is deflected upwardly, as in Fig. 5, the end portion 72 of plate 51, as it is withdrawn from the trailing edge recess, slides along the extremity of edge portion 30 while edge portion 70 of plate 50 moves along the edge 28 as it moves into said recess. Similarly when the elevator is deflected downwardly into the Fig. 6 position, surfaces 70 and 72 move in reverse directions over edges 28 and 30 and remain in close proximity thereto throughout such movement.

As a result of these improvements it will be evident that a construction has been provided for sealing the hinge gap between a pivoted auxiliary surface and the main surface on which it is pivoted while also providing a continuous smooth surface at the juncture between such main and auxiliary surfaces throughout the range of angular deflection of the pivoted surface.

It will also be evident that the hinge joint sealing structure of this invention can be cheaply manufactured and assembled and that being entirely of rigid metal parts it will be free from trouble in use.

While one embodiment of the invention has been shown for purposes of illustration it will be obvious that various changes in the construction and arrangement of the parts is possible and that the invention may be adapted to use in connection with widely different hinged surfaces of airplanes without departing from the scope of the invention as described in the following claims.

I claim:

1. In combination, a main airfoil portion having a trailing edge, a bracket extended rearwardly from said main portion beyond said trailing edge, an angularly adjustable auxiliary portion having a pivotal connection to said bracket, said connection providing a chordwise gap between said portions at the top and bottom surfaces thereof, a gap closure means pivoted to the top and bottom surfaces of said auxiliary portion at the leading edge thereof and extending forwardly therefrom into said main airfoil portion, and means carried by said bracket and pivotally connected to said closure means for maintaining the forward edges of the latter in gap closing relation with respect to the top and bottom surfaces of said main airfoil portion throughout the range of angular adjustment of said auxiliary portion.

2. In combination, a main airfoil portion, a bracket extended rearwardly from said portion, an angularly adjustable auxiliary portion having a pivotal connection to said bracket, said connection providing a lateral gap between said portions at the top and bottom surfaces of said airfoil, rigid gap closing plates pivoted to the top and bottom surfaces of said auxiliary portion at the leading edge thereof and extending forwardly therefrom into the vertical space between the top and bottom surfaces of said main portion, and transverse link means carried by said main portion and having pivotal connections with said plates for guiding the latter about their pivots as said auxiliary portion is adjusted angularly about its pivot, the free ends of said plates which are disposed within said main airfoil portion being mutually inwardly deflected to maintain the same constantly in adjacency to the top and bottom surface extremities of the main airfoil portion throughout the range of angular adjustment of said auxiliary airfoil portion.

3. In combination, a main airfoil portion, an angularly adjustable auxiliary control portion pivoted to said main portion, said main and auxiliary portions having the confronting trailing and leading edges of their top surfaces spaced apart in a chordwise direction, a sheet metal plate pivoted to the top surface of said auxiliary portion and projecting forwardly therefrom into said main portion in adjacency to the top surface portion of the latter, and means carried by said main airfoil portion and having a pivotal connection to said plate for guiding said plate into positions in which it forms substantially a smooth chordwise continuation of the upper surface of said main portion throughout adjustment of said auxiliary portion about its pivot.

4. In combination, a fixed main airfoil portion, an auxiliary portion constituting a relatively hinged part of the trailing edge portion of said fixed portion and spaced chordwise from said fixed portion to provide a hinge gap therebetween, said auxiliary portion being adjustable into a plurality of angularly related positions relative to the medial plane of said main portion, plate means pivotally connected to the leading edge of said auxiliary portion and flush with the top and bottom surfaces thereof, said plate means extending forwardly across said gap and overlapping the top and bottom surfaces of said main portion, and plate guiding means carried by said main portion and pivotally connected to said plate means for maintaining said plate means in position to provide substantially smooth and continuous surfaces between said airfoil portions throughout the range of adjustment of said auxiliary surface portion.

5. In combination, a main airfoil portion having a trailing edge recess, an auxiliary portion having a leading edge recess, brackets carried by each of said portions which project rearwardly and forwardly out of their respective recesses, pivot means connecting said brackets, said brackets being positioned on said airfoil portions so that the top and bottom surfaces of said respective portions are spaced apart in a chordwise direction, top and bottom closure plates pivoted at their rear edges to the top and bottom surfaces respectively of said auxiliary portion, said plates having their free forward ends extended across the space between said portions and into said trailing edge recess, and means mounted on said main portion bracket and having pivotal connections with said plates for maintaining the latter in continuity with the rearwardly projecting recessed surfaces of said main portion during relative movements of said surfaces about their pivotal connection.

6. In combination, a main airfoil having upper and lower surfaces terminating in vertically spaced trailing edges, an auxiliary airfoil adjustable above and below a neutral position relative to said main airfoil and having upper and lower surfaces terminating in vertically spaced leading edges, means for pivotally mounting said auxiliary airfoil on said main airfoil with said leading and trailing edges in chordwise spaced relation, upper and lower closure means pivotally mounted on one of said airfoils and extending across the spaces between said upper and lower edges and extending within the vertically spaced edges of said other airfoil, and means mounted on said other airfoil and pivotally connected with said closure means for maintaining the latter constantly in space closing relationship throughout the entire range of angular movement of said auxiliary airfoil.

7. In combination, a main airfoil having a surface terminating in a trailing edge, an auxiliary airfoil having a corresponding surface provided with a leading edge, means for supporting said auxiliary airfoil on said main airfoil for pivotal movement of the former above and below a neutral position relative to the latter in which said surfaces lie substantially in a common plane, said pivotal support being such that in all pivotal positions of said auxiliary airfoil relative to said main airfoil said leading and trailing edges thereof are maintained in fore and aft spaced relation, a closure member pivotally mounted on an edge of one of said surfaces and extended across said space and overlapping said other surface, and a guide link pivotally mounted on the other airfoil and pivotally connected with said closure member at a point spaced from its pivot for maintaining said closure member constantly in space bridging position throughout the entire range of angular movement of said auxiliary surface above and below said neutral position.

8. In combination, a main airfoil portion, an angularly adjustable auxiliary control portion pivoted to said main portion, said main and auxiliary portions having the confronting trailing and leading edges of their top surfaces spaced apart in a chordwise direction to provide a gap therebetween, a closure member for bridging said gap pivoted to the top surface of said auxiliary portion and projecting forwardly across said gap to said main portion, and means carried by said main portion and having a pivotal connection to said closure member for guiding said member into positions in which it forms substantially a smooth chordwise continuation of the upper surfaces of said main and auxiliary portions in all angular positions of adjustment of said auxiliary portion about its pivot.

JOHN M. LANG.

REFERENCES CITED

The following references are of record in the file of this patent:

UNITED STATES PATENTS

| Number | Name | Date |
|---|---|---|
| 2,334,975 | Williams | Nov. 23, 1943 |
| 2,370,893 | Utsch | Mar. 6, 1945 |

FOREIGN PATENTS

| Number | Country | Date |
|---|---|---|
| 176,909 | Great Britain | Mar. 21, 1922 |
| 431,986 | Germany | July 21, 1926 |
| 524,814 | France | May 20, 1921 |